United States Patent
Kim (10) Patent No.: US 12,311,898 B2
(45) Date of Patent: May 27, 2025

(54) METHOD AND APPARATUS FOR CONTROLLING VEHICLE BRAKE

(71) Applicant: HYUNDAI MOBIS CO., LTD., Seoul (KR)

(72) Inventor: Jong Sung Kim, Seoul (KR)

(73) Assignee: HYUNDAI MOBIS CO., LTD., Seoul (KR)

(*) Notice: Subject to any disclaimer, the term of this patent is extended or adjusted under 35 U.S.C. 154(b) by 199 days.

(21) Appl. No.: 18/074,040

(22) Filed: Dec. 2, 2022

(65) Prior Publication Data
US 2023/0406279 A1    Dec. 21, 2023

(30) Foreign Application Priority Data

Jun. 20, 2022   (KR) .................. 10-2022-0074970

(51) Int. Cl.
| | | |
|---|---|---|
| *B60T 13/74* | (2006.01) | |
| *B60T 7/04* | (2006.01) | |
| *B60T 8/17* | (2006.01) | |
| *B60T 8/28* | (2006.01) | |
| *B60T 13/66* | (2006.01) | |

(52) U.S. Cl.
CPC ............ *B60T 13/741* (2013.01); *B60T 7/042* (2013.01); *B60T 8/17* (2013.01); *B60T 8/28* (2013.01); *B60T 13/662* (2013.01); *B60T 2220/04* (2013.01); *B60Y 2400/81* (2013.01)

(58) Field of Classification Search
None
See application file for complete search history.

(56) References Cited

U.S. PATENT DOCUMENTS

| | | | | |
|---|---|---|---|---|
| 7,661,773 | B2* | 2/2010 | Narita | B60T 8/1766 303/9.62 |
| 7,887,145 | B2* | 2/2011 | Niino | B60T 13/18 303/155 |
| 7,987,029 | B2* | 7/2011 | Takenaka | B62D 6/04 116/36 |
| 8,024,091 | B2* | 9/2011 | Takenaka | B60W 50/06 701/72 |
| 8,027,775 | B2* | 9/2011 | Takenaka | B60W 40/10 701/70 |
| 8,050,822 | B2* | 11/2011 | Takenaka | B60W 40/064 303/146 |
| 8,155,852 | B2* | 4/2012 | Takenaka | B60W 10/20 701/72 |

(Continued)

*Primary Examiner* — Kevin R Steckbauer
(74) *Attorney, Agent, or Firm* — NovoTechIP International PLLC (57) ABSTRACT

A braking apparatus for a vehicle and control method thereof is disclosed herein. According to an embodiment of the present disclosure, a control apparatus for a vehicle is provided, the apparatus comprising: an electronic control unit which calculates a target demand value based on a pedal signal, determines whether the target demand value and an actual demand value are the same as a preset value, and controls to increase or decrease the actual demand value; a front wheel control unit which receives the actual demand value from the electronic control unit and controls braking of a front wheel electro-mechanical brake; and a rear wheel control unit which receives the actual demand value from the electronic control unit and controls braking of a rear wheel electro-mechanical brake.

13 Claims, 4 Drawing Sheets

(56) References Cited

U.S. PATENT DOCUMENTS

| | | | | |
|---|---|---|---|---|
| 8,897,986 B2* | 11/2014 | Ono | B60T 8/1755 | |
| | | | 701/72 | |
| 9,889,831 B2* | 2/2018 | Yasui | B60T 8/172 | |
| 10,625,719 B2* | 4/2020 | Eckert | B60T 8/268 | |
| 11,648,919 B2* | 5/2023 | Yamamoto | B60T 8/26 | |
| | | | 701/70 | |
| 11,999,339 B2* | 6/2024 | Leibbrand | B60T 17/221 | |
| 2007/0024114 A1* | 2/2007 | Narita | B60T 8/1766 | |
| | | | 303/174 | |
| 2007/0210642 A1* | 9/2007 | Niino | B60T 13/18 | |
| | | | 303/11 | |
| 2009/0012669 A1* | 1/2009 | Takenaka | B60W 10/20 | |
| | | | 701/31.4 | |
| 2009/0132137 A1* | 5/2009 | Takenaka | B60W 40/101 | |
| | | | 701/70 | |
| 2009/0171526 A1* | 7/2009 | Takenaka | B60W 40/101 | |
| | | | 701/70 | |
| 2009/0187302 A1* | 7/2009 | Takenaka | B62D 6/04 | |
| | | | 701/33.8 | |
| 2009/0319114 A1* | 12/2009 | Takenaka | B60W 10/04 | |
| | | | 701/48 | |
| 2013/0282253 A1* | 10/2013 | Ono | B60T 8/1755 | |
| | | | 701/72 | |
| 2015/0224970 A1* | 8/2015 | Yasui | B60T 8/1761 | |
| | | | 701/74 | |
| 2018/0304871 A1* | 10/2018 | Eckert | B60T 8/17554 | |
| 2020/0062229 A1* | 2/2020 | Amamoto | B60T 8/76 | |
| 2021/0188231 A1* | 6/2021 | Yamamoto | B60T 8/1766 | |
| 2022/0289158 A1* | 9/2022 | Leibbrand | B60T 8/94 | |
| 2023/0406279 A1* | 12/2023 | Kim | B60T 7/042 | |
| 2024/0010174 A1* | 1/2024 | Kim | B60T 8/172 | |
| 2024/0075912 A1* | 3/2024 | Kim | B60T 8/17636 | |

* cited by examiner

METHOD AND APPARATUS FOR CONTROLLING VEHICLE BRAKE

CROSS-REFERENCE TO RELATED APPLICATIONS

The present application is based on and claims the benefit of priority to Korean Patent Application Number 10-2022-0074970, filed on Jun. 20, 2022 in the Korean Intellectual Property Office, the entire disclosure of which is incorporated herein by reference.

TECHNICAL FIELD

The present disclosure relates to a braking apparatus for a vehicle and a control method thereof.

BACKGROUND

The description in the present section merely provides background information related to the present disclosure and does not necessarily constitute the related art.

An electro-mechanical brake is a device that generates braking force by pressing a piston using a mechanism such as a gear or a screw. The electro-mechanical brake does not use hydraulic pressure, but a motor-driven actuator is mounted directly on a caliper to brake. The electro-mechanical brake may perform independent braking for each wheel. The electro-mechanical brake may implement additional functions such as, for example, main braking control, ABS (Anti-lock Braking System), ESC (Electronic Stability Control), TCS (Traction Control System), and AEB (Autonomous Emergency Brake system).

When a vehicle is stopped, if the friction force on a road surface is insufficient or the braking force of a brake exceeds the braking force of a tire, a wheel lock phenomenon occurs at vehicle wheels. The wheel lock phenomenon may be overcome by performing ABS control. However, even when ABS control is applied, if the wheel lock phenomenon occurs at the rear wheels before the front wheels, the posture of the vehicle may become unstable and a dangerous situation may occur.

A hydraulic braking method delays the hydraulic pressure rise speed based on the differential design of an orifice size of a solenoid valve connected to the rear wheel so that the response of the rear wheel becomes slower than that of the front wheel. The response of the rear wheel of the electro-mechanical brake system may also be slow when the motor performance of the rear wheel electro-mechanical brake is insufficient.

When an actuator of the electro-mechanical brake is shared with the front and rear wheels or the specifications of a vehicle model are simplified, the required operating force of the rear wheel electro-mechanical brake is lower than the required operating force of the front wheel electro-mechanical brake. Because the stroke is also short, a situation in which the response of the rear wheel electro-mechanical brake is faster may occur. When the response of the rear wheel electro-mechanical brake is faster than that of the front wheel electro-mechanical brake, there is an issue in that a wheel lock phenomenon occurs at the rear wheel before the front wheel. Accordingly, in order to address the above-mentioned issues, it is necessary to develop a technology for the operation response control of the electro-mechanical brake.

SUMMARY

According to an embodiment of the present disclosure, a control method of a vehicle is provided, the method comprising: initializing an actual demand value for performing a target braking by following a target demand value; initializing a timer that measures and outputs an elapsed time of a process; calculating the target demand value based on a pedal signal; determining whether all or some of the target demand value and the actual demand value are the same as a preset value; and increasing or decreasing the actual demand value when at least one of the target demand value and the actual demand value is determined to be different from the preset value.

According to an embodiment of the present disclosure, a control apparatus for a vehicle is provided, the apparatus comprising: an electronic control unit which calculates a target demand value based on a pedal signal, determines whether the target demand value and an actual demand value are the same as a preset value, and controls to increase or decrease the actual demand value; a front wheel control unit which receives the actual demand value from the electronic control unit and controls braking of a front wheel electro-mechanical brake; and a rear wheel control unit which receives the actual demand value from the electronic unit and controls braking of a rear wheel electro-mechanical brake.

DETAILED DESCRIPTION

In a braking apparatus for a vehicle and a control method thereof according to an embodiment, an electronic control unit reduces the operation response of a rear wheel electro-mechanical brake to be less than the operation response of a front wheel electro-mechanical brake, so that regardless of the actuator specifications of the front wheel electro-mechanical brake and the rear wheel electro-mechanical brake, the driving stability of the vehicle may be secured by controlling the rear wheel to prevent a wheel lock phenomenon from occurring first.

The braking apparatus for the vehicle and the control method thereof according to an embodiment may improve the performance of an electro-mechanical brake and reduce the cost by increasing the degree of freedom, common use, and standardization rate in the electro-mechanical brake actuator design specification.

The aspects of the present disclosure are not limited to those mentioned above, and other aspects not mentioned herein will be clearly understood by those skilled in the art from the following description.

Hereinafter, some exemplary embodiments of the present disclosure will be described in detail with reference to the accompanying drawings. In the following description, like reference numerals preferably designate like elements, although the elements are shown in different drawings. Further, in the following description of some embodiments, a detailed description of known functions and configurations incorporated therein will be omitted for the purpose of clarity and for brevity.

Additionally, various terms such as first, second, A, B, (a), (b), etc., are used solely to differentiate one component from the other but not to imply or suggest the substances, order, or sequence of the components. Throughout this specification, when a part 'includes' or 'comprises' a component, the part is meant to further include other components, not to exclude thereof unless specifically stated to the contrary. The terms such as 'unit', 'module', and the like refer to one or more units for processing at least one function or operation, which may be implemented by hardware, software, or a combination thereof.

Figure 1:
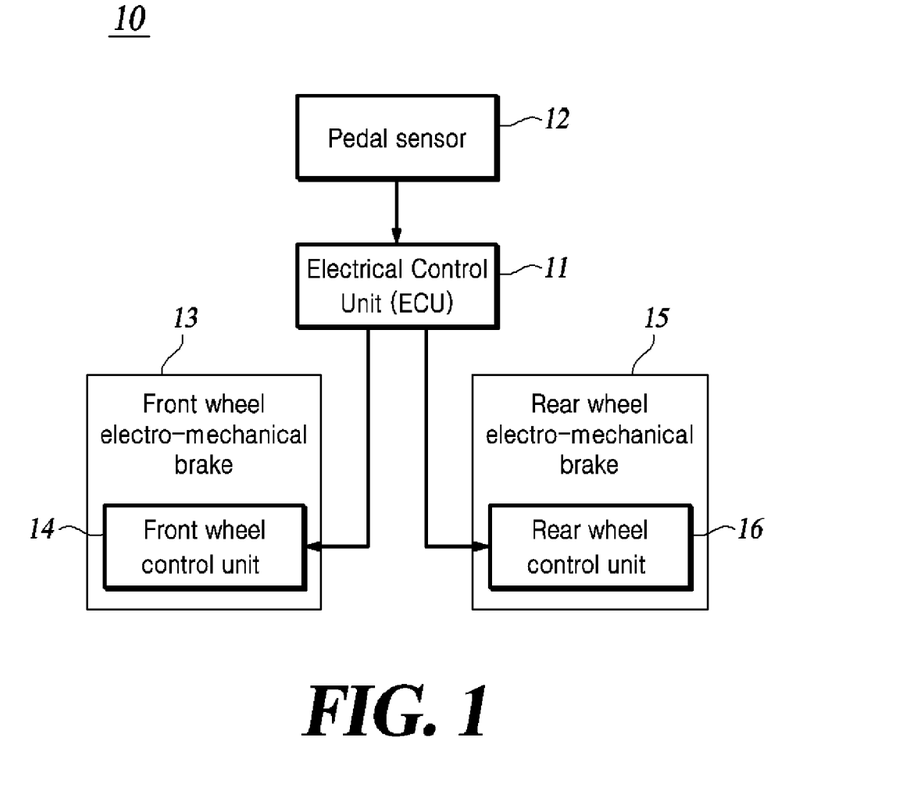
FIG. 1 is a configuration diagram of a control apparatus for a vehicle according to an embodiment of the present disclosure.

FIG. 1 is a configuration diagram of a control apparatus for a vehicle according to an embodiment of the present disclosure.

Referring to FIG. 1, a control apparatus 10 for a vehicle may include all or some of an electronic control unit 11 (ECU), a pedal sensor 12, a front wheel electro-mechanical brake 13, a front wheel control unit 14 (front Brake-by-Wire Control Unit), a rear wheel electro-mechanical brake 15, and a rear wheel control unit 16 (rear Brake-by-Wire Control Unit).

The front wheel electro-mechanical brake 13 is provided on one side of a vehicle, and may brake two or more front wheels (not shown). The rear wheel electro-mechanical brake 15 is provided on the other side of the vehicle, and may brake two or more rear wheels (not shown).

In situations where emergency braking is required, a wheel lock phenomenon may occur in vehicle wheels. The wheel lock phenomenon refers to a phenomenon in which normal braking of a vehicle is impossible because the vehicle wheels lock up when the braking force of a brake is greater than the braking force of a tire. When the wheel lock phenomenon occurs in the rear wheel before the front wheel, the balance of a vehicle body is lost, which may cause a dangerous situation such as a spin phenomenon or a drift phenomenon (a sideways tilt phenomenon) of the vehicle body. In order to prevent a dangerous situation, the electronic control unit 11 may delay the operation response of the rear wheels compared to the operation response of the front wheels.

The determination of whether a vehicle requires braking may be made based on various factors, for example, a pedal depression amount (not shown). The pedal sensor 12 may transmit a pedal signal based on the pedal depression amount. For example, the pedal sensor 12 may be connected to at least one controller among the electronic control unit 11, the front wheel control unit 14, and the rear wheel control unit 16 to transmit the pedal signal to all or some of these controllers.

The electronic control unit 11 may calculate a target demand value by receiving a pedal signal from the pedal sensor 12. The target demand value refers to an ideal braking value of an actuator (not shown) driven based on the pedal signal. For example, when the electronic control unit 11 receives the pedal signal and calculates a braking demand value as, for example, 10 N (newton), the target demand value may be calculated as 10 N.

The electronic control unit 11 may calculate an actual demand value that follows the target demand value. The actual demand value refers to an actual braking value of the actuator for performing the braking target by following the target demand value calculated from a pedal signal. The actual demand value may increase or decrease by a preset amount of braking for a preset time. For example, when the electronic control unit 11 calculates the target demand value as, for example, 10 N based on the pedal signal, the actual demand value is increased by a preset braking amount for a preset time to reach the target demand value.

The electronic control unit 11 may transmit the calculated actual demand value to the front wheel control unit 14 and the rear wheel control unit 16. The front wheel control unit 14 and the rear wheel control unit 16 may receive the actual demand value from the electronic control unit 11, and control the front wheel electro-mechanical brake 13 and the rear wheel electro-mechanical brake 15 based on the received actual demand value.

By differentially setting the correction value of the actual demand value transferred to the front wheel control unit 14 and the rear wheel control unit 16, the electronic control unit 11 may control the operation response of the front wheel electro-mechanical brake 13 and the rear wheel electro-mechanical brake 15. For example, the electronic control unit 11 may set a large correction value of the actual demand value transferred to the front wheel electro-mechanical brake 13 and set a small correction value of the actual demand value transferred to the rear wheel electro-mechanical brake 15.

As the electronic control unit 11 makes the correction value of the rear wheel electro-mechanical brake 15 smaller, the operation response of the rear wheel electro-mechanical brake 15 may be delayed. For example, when the operation response of the rear wheel electro-mechanical brake 15 is smaller than that of the front wheel electro-mechanical brake 13, the operation response of the rear wheel electro-mechanical brake 15 may be delayed more than that of the front wheel electro-mechanical brake 13, and the wheel lock phenomenon may also be delayed.

The correction value may be calculated by computing a unit correction value (, omitted hereinafter) increasing/decreasing per unit time and an elapsed time value of a process. Herein, the unit correction value may include a braking amount that increases or decreases per unit time. The electronic control unit 11 may calculate a correction value by computing a braking amount that increases/decreases per unit time and an elapsed time value of a process provided by a timer. The correction value may include a function over time and be proportional to the elapsed time value of the process.

The actual demand value may be increased or decreased by the correction value and transferred to the wheel control unit. For example, the response speed of the actual demand value transferred to the front wheel control unit 14 and the rear wheel control unit 16 may be controlled to be faster as the correction value is greater and slower as the correction value is smaller.

When the actual demand value is increased or decreased, the electronic control unit 11 may calculate a correction value and may increase or decrease the actual demand value based thereon. The timer time may be initialized after a preset process is performed based on the control of the electronic control unit 11. The timer means the time elapsed from the initialization to the process being performed by the electronic control unit 11.

When the electronic control unit 11 calculates the actual demand value, after the actual demand value corresponding to a variable pedal signal is calculated, the timer may be initialized.

Figure 2:
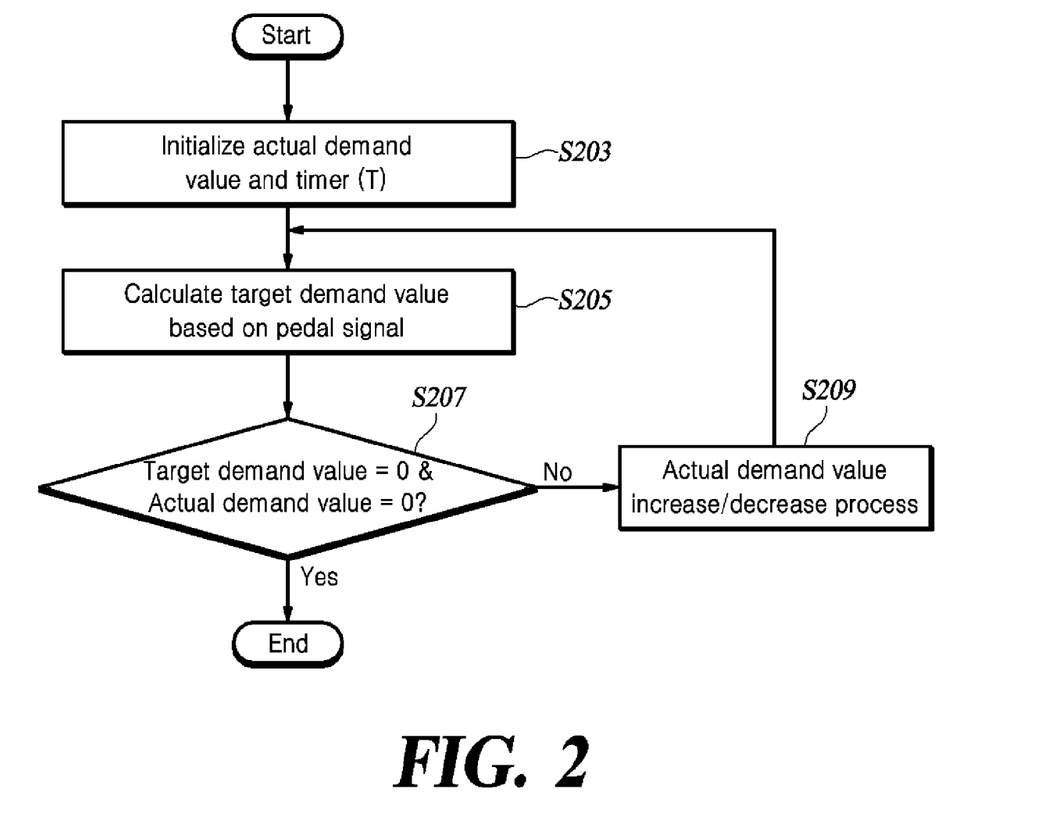
FIG. 2 is a flowchart of a control method for a vehicle according to an embodiment of the present disclosure.

FIG. 2 is a flowchart of a control method for a vehicle according to an embodiment of the present disclosure.

Referring to FIG. 2, an actual demand value and a timer are initialized (S203). The electronic control unit 11 may initialize an actual demand value and a timer. Herein, the initialized value of the actual demand value may be, for example, 0 N. The actual demand value is initialized when the process starts, and it may be preferable to follow the target demand value.

A target demand value is calculated based on a pedal signal (S205). The electronic control unit 11 may receive the pedal signal using the pedal sensor 12. The electronic control unit 11 may calculate the target demand value based on the received pedal signal. The electronic control unit 11 may calculate an actual demand value that follows the target demand value. The actual demand value is a demand value for following the target demand value calculated based on the pedal depression amount, and may be calculated by computing with a correction value from the electronic control unit 11.

It is determined whether the target demand value and the actual demand value are each the same as a preset value (S207).

In process S207, when both the target demand value and the actual demand value are the same as the preset value, for example, even when a driver does not transmit a braking command or the electronic control unit 11 receives a pedal signal, it may be determined that the performance of the pedal signal has been completed.

In process S207, when at least one of the target demand value and the actual demand value is not the same as the preset value, the electronic control unit 11 performs a response increase/decrease process (S209). The response increase/decrease process is a process in which the electronic control unit 11 calculates a target demand value based on the pedal signal received from the pedal sensor 12 and calculates an actual demand value that follows the calculated target demand value. The electronic control unit 11 may compare the calculated target demand value and the actual demand value, and control to increase or decrease the actual demand value based on the compared difference value. The response increase/decrease process will be described in more detail with reference to FIG. 3.

Figure 3:
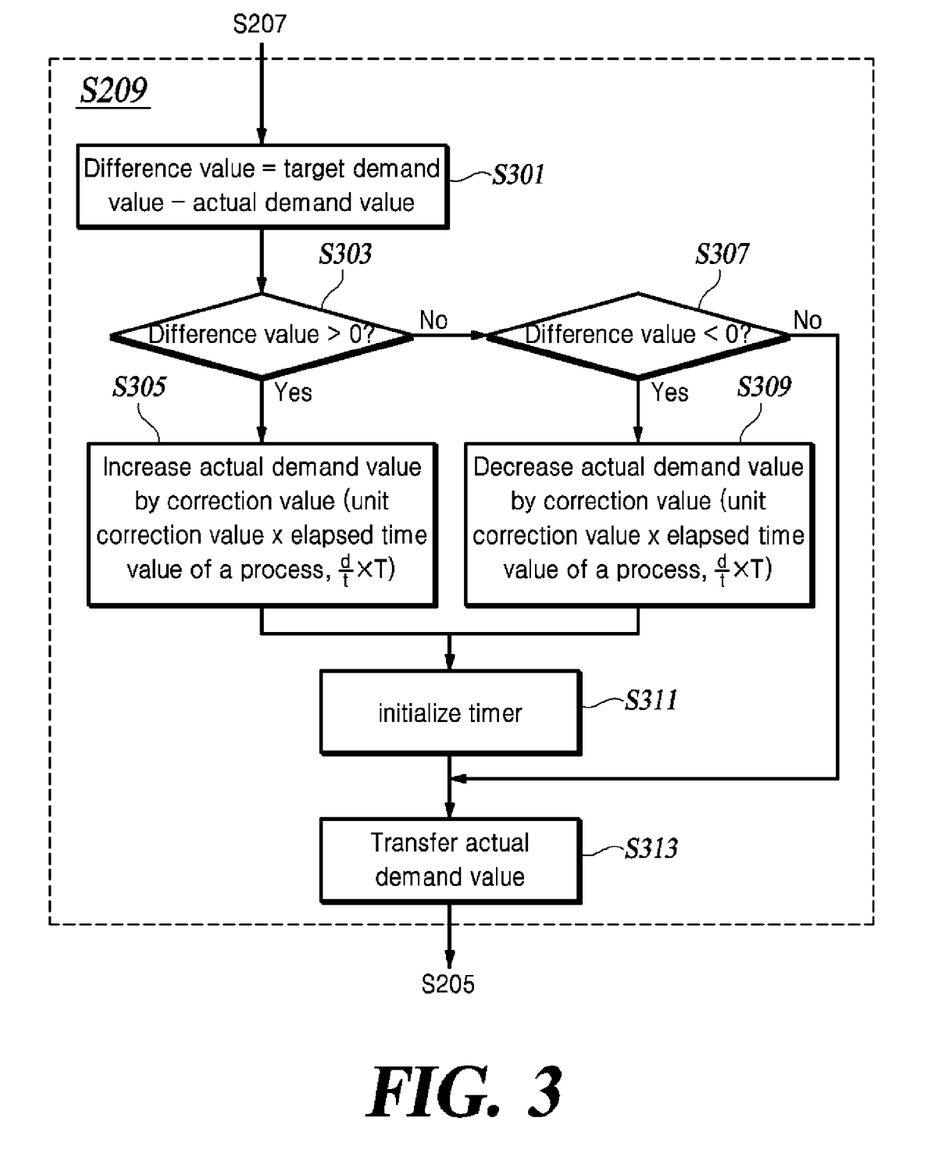
FIG. 3 is a flowchart showing a response increase/decrease process of a control method for a vehicle according to an embodiment of the present disclosure.

FIG. 3 is a flowchart showing a response increase/decrease process of a control method for a vehicle according to an embodiment of the present disclosure.

Referring to FIG. 3, a difference value is calculated by computing an actual demand value from a target demand value (S301). The electronic control unit 11 may calculate a difference value between the target demand value and the actual demand value, and increase or decrease the actual demand value based on the difference value.

In process S301, it is determined whether the difference value is a positive number (S303). When the difference value is a positive number, it means that the target demand value is greater than the actual demand value.

In process S301, when it is determined that the difference value is a positive number, the electronic control unit 11 increases the actual demand value by a preset amount (S305). The electronic control unit 11 may increase the actual demand value by the correction value so as to follow the target demand value.

In process S301, when it is determined that the difference value is not a positive number, it is determined whether the difference value is a negative number (S307). When the difference value is a negative number, it means that the target demand value is smaller than the actual demand value.

In process S307, when it is determined that the difference value is a negative number, the electronic control unit 11 decreases the actual demand value by a preset amount (S309). The electronic control unit 11 may decrease the actual demand value by the correction value so as to follow the target demand value.

The electronic control unit 11 may increase or decrease the actual demand value transferred to the front wheel control unit 14 and the rear wheel control unit 16. When the actual demand value transferred to the front wheel control unit 14 and the rear wheel control unit 16 is increased or decreased, the electronic control unit 11 may differentially set the correction value. For example, when the electronic control unit 11 controls so that the operation response of the rear wheel electro-mechanical brake 15 is delayed compared to the operation response of the front wheel electro-mechanical brake 13, the electronic control unit 11 may set the correction value of the actual demand value of the front wheel control unit 14 to be greater than the correction value of the actual demand value of the rear wheel control unit 16 and transfer the same to the front wheel control unit 14 or the rear wheel control unit 16.

In process S307, when it is determined that the difference value is not a negative number, it may be determined that the target demand value and the actual demand value are the same. When it is determined that the target demand value and the actual demand value are the same, the electronic control unit 11 may determine that the actual demand value follows the target demand value and becomes the same value. The electronic control unit 11 may transfer the actual demand value equal to the target demand value to the front wheel control unit 14 or the rear wheel control unit 16.

When it is determined that the target demand value and the actual request demand are the same, the electronic control unit 11 may re-receive the target demand value based on a variable pedal signal. When the target demand value is re-received based on the variable pedal signal, the electronic control unit 11 may recalculate the actual demand value following the re-received target demand value.

In processes S305 and S309, when the actual demand value is increased or decreased, a timer is initialized (S311). Herein, the timer refers to a time from initializing in S203 of FIG. 2 to the process of increasing/decreasing the actual demand value.

When the electronic control unit 11 re-receives the target demand value based on the variable pedal signal and calculates the actual demand value, the electronic control unit 11 may increase or decrease the actual demand value by computing the time after the timer is initialized until the current process time with the unit correction value.

The actual demand value may be transferred (S313). The electronic control unit 11 may transfer the actual demand value increased or decreased in processes S305 and S309 to the wheel control unit. Herein, the wheel control unit may include at least one wheel control unit of the front wheel control unit 14 and the rear wheel control unit 16. The front wheel control unit 14 and the rear wheel control unit 16 may receive the actual demand value increased or decreased from the electronic control unit 11 to drive the front wheel electro-mechanical brake 13 and the rear wheel electro-mechanical brake 15.

Figure 4A:
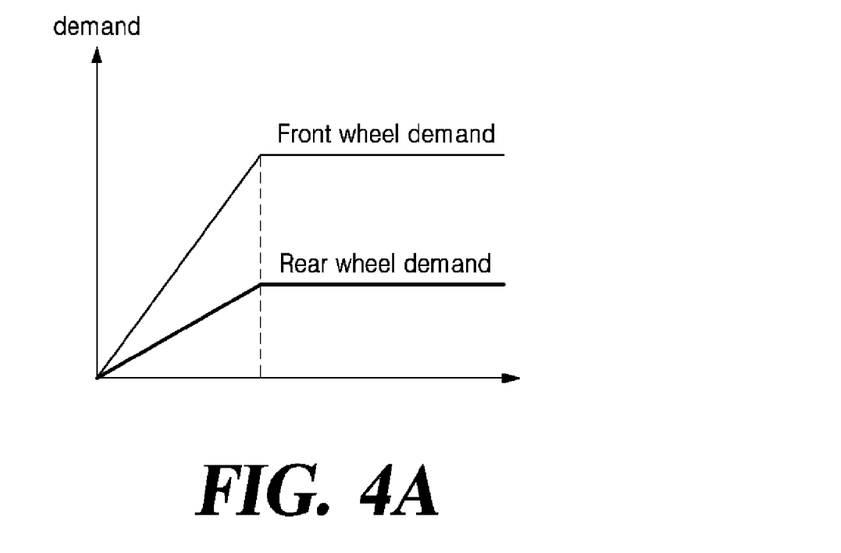
FIG. 4A is a view showing the operation response of the front wheel and the rear wheel according to the related art.

FIG. 4A is a view showing the operation response of the front wheel and the rear wheel according to the related art.

Figure 4B:
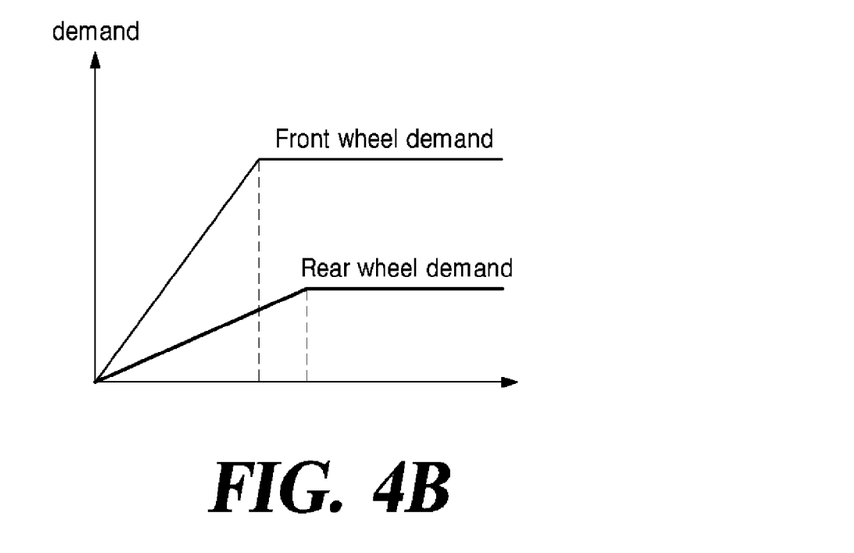
FIG. 4B is a graph showing the operation response of the front wheel and the rear wheel when the correction value of the rear wheel is decreased according to an embodiment of the present disclosure.

FIG. 4B is a graph showing the operation response of the front wheel and the rear wheel when the correction value of the rear wheel is decreased according to an embodiment of the present disclosure.

Referring to FIG. 4A, when a vehicle performs emergency braking, it is not known whether a wheel lock phenomenon that may occur in the front wheels and the rear wheels occurs in one before the other when the operation response of the front wheels and the rear wheels is the same. For example, when the operation response of the rear wheel is faster than the operation response of the front wheel, the wheel lock phenomenon may first occur in the rear wheel.

Referring to FIG. 4B, the electronic control unit 11 may control the operation response of the rear wheels to be delayed compared to the operation response of the front wheels.

When the electronic control unit 11 controls the operation response of the front wheel electro-mechanical brake 13 and the rear wheel electro-mechanical brake 15, the electronic control unit 11 may reduce the correction value of the actual demand value transferred to the rear wheel control unit 16 to control the operation response of the rear wheel electro-mechanical brake 15 to be delayed compared to the operation response of the front wheel electro-mechanical brake 13.

The electronic control unit 11 may control braking by increasing or decreasing a correction value of an actual demand value transferred to the front wheel control unit 14 and the rear wheel control unit 16. For example, when the electronic control unit 11 transfers an actual demand value by making the correction value of the rear wheel electro-mechanical brake 15 smaller than the correction value of the front wheel electro-mechanical brake 13, the operation response of the rear wheel electro-mechanical brake 15 may be delayed compared to the operation response of the front wheel electro-mechanical brake 13.

The electronic control unit 11 may increase the correction value of the actual demand value transferred to the front wheel control unit 14 so that the operation response of the front wheel electro-mechanical brake 13 becomes faster than the operation response of the rear wheel electro-mechanical brake 15.

When the electronic control unit 11 transfers a braking command to the front wheel control unit 14 and the rear wheel control unit 16, the electronic control unit 11 may transfer a target demand value to the front wheel control unit 14 to increase operational response, and may control the rear wheel control unit 16 by reducing and transferring the correction value of the actual demand value.

According to an embodiment of the present disclosure, in a braking apparatus for a vehicle and a control method thereof, the electronic control unit 11 reduces the operation response of the rear wheel electro-mechanical brake 15 to be less than the operation response of the front wheel electro-mechanical brake 13, so that regardless of the actuator specifications of the front wheel electro-mechanical brake 13 and the rear wheel electro-mechanical brake 15, the driving stability may be secured by controlling the rear wheel to prevent a wheel lock phenomenon from occurring first in the rear wheel.

According to an embodiment of the present disclosure, the braking apparatus for the vehicle and the control method thereof may improve the performance of an electro-mechanical brake and reduce the cost by increasing the degree of freedom, common use, and standardization rate in the electro-mechanical brake actuator design specification.

Each component of the device or method according to an embodiment of the present disclosure may be implemented by hardware, software, or a combination of hardware and software. In addition, the function of each component may be implemented by software and the microprocessor may be implemented to execute the function of software corresponding to each component.

Various implementations of the systems and techniques described herein may be implemented by digital electronic circuits, integrated circuits, field programmable gate arrays (FPGAs), application specific integrated circuits (ASICs), computer hardware, firmware, software, and/or a combination thereof. These various implementations may include being implemented in one or more computer programs executable on a programmable system. The programmable system includes at least one programmable processor (which may be a special purpose processor or a general purpose processor) coupled to receive data and instructions from, and transmit data and instructions to, a storage system, at least one input device, and at least one output device. Computer programs (also known as programs, software, software applications or code) include instructions for a programmable processor and are stored on a "computer-readable recording medium."

The computer-readable recording medium includes all types of recording devices in which data readable by a computer system is stored. These computer-readable recording media may include non-volatile or non-transitory media, such as ROM, CD-ROM, magnetic tape, floppy disk, memory card, hard disk, magneto-optical disk, storage device, etc., and may further include transitory media, such as data transmission medium. In addition, the computer-readable recording medium may be distributed in network-connected computer systems, and the computer-readable code may be stored and executed in a distributed manner.

Although it is described that each process is sequentially executed in the flowchart/timing diagram of the present specification, this is merely illustrative of the technical idea of an embodiment of the present disclosure. In other words, one of ordinary skill in the art to which an embodiment of the present disclosure pertains will be able to change and execute the order described in the flowchart and timing diagram without departing from the essential characteristics of an embodiment of the present disclosure, and apply various modifications and variations to executing one or more of each process in parallel. Accordingly, the flowchart/timing diagram is not limited to a time-series order.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand that the scope of the claimed invention is not to be limited by the above explicitly described embodiments but by the claims and equivalents thereof.

What is claimed is:

1. A method of controlling braking of a vehicle comprising (1) a front wheel control unit configured control braking of a front wheel electro-mechanical brake of the vehicle and (2) a rear wheel control unit configured to control braking of a rear wheel electro-mechanical brake of the vehicle, the method comprising:
   initializing an actual demand value for performing target braking by following a target demand value;
   initializing a timer that measures and outputs an elapsed time of a process;
   calculating the target demand value based on a pedal signal indicative of a brake pedal depression amount;

determining whether the target demand value or the actual demand value does not correspond to a preset value; and in response to determining that the target demand value or the actual demand value does not correspond to the preset value, performing:

increasing or decreasing the actual demand value by the preset value; and transmitting the increased or decreased actual demand value to the front and rear wheel control units to control the braking of front and rear wheel electro-mechanical brakes of the vehicle based on the increased or decreased actual demand value, wherein controlling braking of the front and rear wheel electro-mechanical brakes comprises (1) increasing an operation response of the front wheel electro-mechanical brake and (2) decreasing an operation response of the rear wheel electro-mechanical brake, the operation response of the rear wheel electro-mechanical brake being controlled to be smaller than that of the front wheel electro-mechanical brake.

2. The method of claim 1, wherein increasing or decreasing the actual demand value comprises:

calculating a difference value between the target demand value and the actual demand value; and increasing or decreasing the actual demand value based on the difference value.

3. The method of claim 2, wherein increasing or decreasing the actual demand value comprises, in response to the difference value being a positive number, increasing the actual demand value by a correction value.

4. The method of claim 3, wherein the correction value is calculated by computing a unit correction value increasing or decreasing per unit time and an elapsed time value of the process.

5. The method of claim 3, wherein increasing or decreasing the actual demand value comprises, in response to the difference value being a negative number, decreasing the actual demand value by the correction value.

6. The method of claim 5, wherein the correction value is calculated by computing a unit correction value increasing or decreasing per unit time and an elapsed time value of the process.

7. The method of claim 1, further comprising initializing the timer in response to the actual demand value being increased or decreased.

8. The method of claim 2, wherein the actual demand value is not increased or decreased when the difference value between the target demand value and the actual demand value is determined to be 0.

9. The method of claim 1, further comprising determining whether the target demand value and the actual demand value correspond to the preset value after performing increasing or decreasing the actual demand value.

10. The method of claim 9, further comprising, in response to the target demand value and the actual demand value not corresponding to the preset value, recalculating the target demand value based on the pedal signal, and determining whether the recalculated target demand value and the actual demand value correspond to the preset value.

11. The method of claim 10, further comprising, in response to the recalculated target demand value and the actual demand value not corresponding to the preset value, repeatedly performing increasing or decreasing the actual demand value according to the recalculated target demand value.

12. A apparatus for controlling braking of a vehicle, the apparatus comprising:

an electronic control unit configured to calculate a target demand value based on a pedal signal indicative of a brake pedal depression amount, determine whether the target demand value and an actual demand value correspond to a preset value, and control to increase or decrease the actual demand value;

a front wheel control unit configured to receive the actual demand value from the electronic control unit and control braking of a front wheel electro-mechanical brake; and a rear wheel control unit configured to receive the actual demand value from the electronic control unit and control braking of a rear wheel electro-mechanical brake, wherein the electronic control unit is configured to increase an operation response of the front wheel electro-mechanical brake and decrease an operation response of the rear wheel electro-mechanical brake, the operation response of the rear wheel electro-mechanical brake being controlled to be smaller than that of the front wheel electro-mechanical brake, and wherein the electronic control unit is further configured to, in response to the target demand value or the actual demand value not corresponding to the preset value, increase or decrease the actual demand value by the preset value and transmits the actual demand value to the front wheel control unit and the rear wheel control unit.

13. The apparatus of claim 12, wherein the electronic control unit is configured to, in response to the target demand value or the actual demand value not corresponding to the preset value, increase or decrease the actual demand value by the preset value again.

* * * * *